United States Patent [19]

Niwa et al.

[11] Patent Number: 4,608,645
[45] Date of Patent: Aug. 26, 1986

[54] NUMERICAL CONTROL SYSTEM FOR A MACHINE TOOL WITH A TOOL DIMENSION COMPENSATION FUNCTION

[75] Inventors: Kuniyuki Niwa; Yoshiyuki Fujimura, both of Kariya, Japan

[73] Assignee: Toyoda Koki Kabushiki Kaisha, Kariya, Japan

[21] Appl. No.: 609,218

[22] Filed: May 11, 1984

[30] Foreign Application Priority Data

May 17, 1983 [JP] Japan .................................. 58-87162

[51] Int. Cl.⁴ ........................ G06F 15/46; G05B 23/02
[52] U.S. Cl. ..................................... 364/474; 29/568; 318/572; 318/632; 364/170
[58] Field of Search ................................ 364/167–171, 364/474, 475; 318/572, 632, 563, 565; 29/568

[56] References Cited

U.S. PATENT DOCUMENTS

| 3,685,022 | 8/1972 | Raynes ............................. 364/170 X |
| 4,162,527 | 7/1979 | Kilbane et al. .................. 364/170 X |
| 4,330,831 | 5/1982 | Schwefel ......................... 364/170 X |
| 4,404,506 | 9/1983 | Nishimura et al. ................ 318/561 |
| 4,430,717 | 2/1984 | Senda et al. ..................... 364/170 X |
| 4,497,029 | 1/1985 | Kiyokawa ........................ 364/170 X |

Primary Examiner—Joseph Ruggiero
Attorney, Agent, or Firm—Oblon, Fisher, Spivak, McClelland & Maier

[57] ABSTRACT

A numerical control system is provided wherein numerical controllers associated with machine tools are respectively coupled to auxiliary controllers communicating with a host computer. Each auxiliary controller has a memory for storing revision values which respectively correspond to primary and spare tools being stored in a tool magazine of the associated machine tool. When a spare tool is attached to a tool spindle of the associated machine tool in place of a primary tool, each auxiliary controller reads out a corresponding revision value from the memory and transfers it to the associated numerical controller. Thus, a corresponding one of tool dimension compensation values being stored in a memory of the associated numerical controller is revised or modified by the revision value transferred thereto so as to adapt itself for the spare tool being used on the tool spindle. Further, when the primary tool is taken out from the tool magazine and a secondary spare tool is set up therein instead, the host computer reads out from its memory a revision value corresponding to the secondary spare tool and transfers it to the auxiliary controller. This revision value is stored in the memory of the auxiliary controller for later transfer to the associated numerical controller in connection with the use of the secondary spare tool on the tool spindle.

9 Claims, 13 Drawing Figures

| PRIMARY TOOL NO. | LIFE TIME | USED TIME | SPARE TOOL NO. | LENGTH REV. VALUE | DIA. REV. VALUE |
|---|---|---|---|---|---|
| T01 | L01 | U01 | T01 | H01 | D01 |
| T03 | L03 | U03 | T23 | H03 | D02 |
| T05 | L05 | U05 | T25 | H05 | D05 |
| ⋮ | ⋮ | ⋮ | ⋮ | ⋮ | ⋮ |
| T21 | L21 | U21 | T01 | H21 | D21 |
| T25 | L25 | U25 | T25 | H25 | D25 |
| ⋮ | ⋮ | ⋮ | ⋮ | ⋮ | ⋮ |

TIT

FIG. 3(a)

| TOOL CONTROL NO. | LIFE TIME | LENGTH REV. VALUE | DIA. REV. VALUE |
|---|---|---|---|
| T0120 | $l_1$ | $h_1$ | $d_1$ |
| T0355 | $l_2$ | $h_2$ | $d_2$ |
| T0503 | $l_3$ | $h_3$ | $d_3$ |
| ⋮ | ⋮ | ⋮ | ⋮ |
| T2110 | $l_{n-1}$ | $h_{n-1}$ | $d_{n-1}$ |
| T2500 | $l_n$ | $h_n$ | $d_n$ |
| ⋮ | ⋮ | ⋮ | ⋮ |

MIT

FIG. 3(b)

| MT 1 | | |
|---|---|---|
| TOOL NO. | TOOL CONTROL NO. | SPARE TOOL CONTROL NO. |
| ⋮ | ⋮ | ⋮ |
| T 21 | T 1150 | T 2110 |
| T 22 | T 1230 | T 2500 |
| ⋮ | ⋮ | ⋮ |

STT

NUMERICAL CONTROL SYSTEM FOR A MACHINE TOOL WITH A TOOL DIMENSION COMPENSATION FUNCTION

BACKGROUND OF THE INVENTION

1. Field of the Invention

The present invention relates in general to a numerical control system for a machine tool. More particularly, it relates to such a numerical control system capable of revising one of tool dimension compensation values when a spare tool which is designated in accordance with a numerical control program (hereafter referred to as "NC program" is attached to a tool spindle of the machine tool in place of the primary tool.

2. Description of the Prior Art

In a known numerical control system for a machine tool with an automatic tool changer, a spare tool which is prepared to replace a primary tool designated in accordance with an NC program is attached to a tool spindle of the machine tool in place of the primary tool when the same reaches the end of its life or is broken. At such time, a dimension compensation value registered for the primary tool can no longer be used for the spare tool. That is, it is usual that the dimension compensation value for the spare tool is different from that for the life-expired tool.

In order to obviate such inconvenience, in the known numerical control system, revision values which respectively correspond to spare tools being stored along with primary tools in the tool magazine are set in advance respectively in data setting devices, and when one of the spare tools is attached to the tool spindle, a corresponding one of the revision values is supplied to the numerical controller so as to revise a dimension compensation value designated in accordance with the NC program. Thus, the dimension compensation value being stored in the numerical controller for the primary tool is modified to represent the dimension compensation value for the spare tool.

However, in the known numerical control system, it is impossible to automatically modify the revision values being set in the date setting devices. Therefore, when the life of the spare tool also expires and when a secondary spare tool for the primary tool is attached to the tool spindle in place of the life-expired spare tool, manual data setting is required to change the revision value for adaptation to the secondary spare tool. Thus, the known numerical control system is caused to discontinue its automatic continuous operation when the life of the first spare tool expires.

SUMMARY OF THE INVENTION

Accordingly, it is a principal object of the present invention to provide an improved numerical control system for a machine tool which is capable of automatically revising dimension compensation data when a spare tool is attached to a tool spindle of the machine tool in place of a spare tool whose life has expired, so that a primary tool and a number of spare tools therefor can be used in the numerical control system without human intervention.

Another object of the present invention is to provide an improved numerical control system of the character set forth above wherein each of a plurality of spare tools, when used on a tool spindle, is regarded or disguised as the primary tool, so that a numerical control program can be used for the primary tool and any spare tools.

A further object of the present invention is to provide an improved numerical control system of the character set forth above wherein a plurality of tools are distinguished by their tool numbers from one another within a numerical controller and an auxiliary controller therefor, and are distinguished by their tool control numbers each having a larger figure number than each of the tool numbers, from one another within a host computer remote from the machine tool site, thereby enabling the host computer to govern an increased number of tools.

Briefly, according to the present invention, there is provided a numericl control system comprising a machine tool with an automatic tool changer, an auxiliary controller and a host computer located remotely therefrom. The auxiliary controller includes a data memory for storing a plurality of compensation data which respectively correspond to tools being stored in a tool magazine of the machine tool. When a spare tool is attached to a tool spindle of the machine tool in place of the primary tool, the auxiliary controller reads out from the data memory compensation data corresponding to the spare tool and transfers it to the numerical controller for use in a tool dimension compensation operation by the numerical controller. The host computer includes a main memory for storing a plurality of compensation data for tools which are scheduled to be set up in the tool magazine, along with tool numbers of the tools. When a secondary spare tool is set up in the tool magazine in place of the primary tool, the host computer reads out from the main memory compensation data corresponding to the secondary spare tool and transfers it to the auxiliary controller. The auxiliary controller responds to the compensation data transferred from the host computer and stores it in the data memory thereof for later use.

With this configuration, each time a tool is taken out from the tool magazine and a spare tool therefor is set up therein instead, compensation data corresponding to the spare tool is transferred from the host computer to the auxiliary controller to be stored in the data memory for use in a tool dimension compensation operation which is subsequently performed by the numerical controller in connection with the attachment of the spare tool to the tool spindle. Accordingly, each tool and a number of spare tools therefor can be serially used on the tool spindle without human intervention.

BRIEF DESCRIPTION OF THE ACCOMPANYING DRAWINGS

The foregoing and other objects, features and attendant advantages of the present invention will be readily appreciated as the same becomes better understood by reference to the following detailed description of preferred embodiments when considered in connection with the accompanying drawings, wherein like reference numerals designate identical or corresponding parts throughout the several views, and in which.

DETAILED DESCRIPTION OF THE PREFERRED EMBODIMENTS

Figure 1:
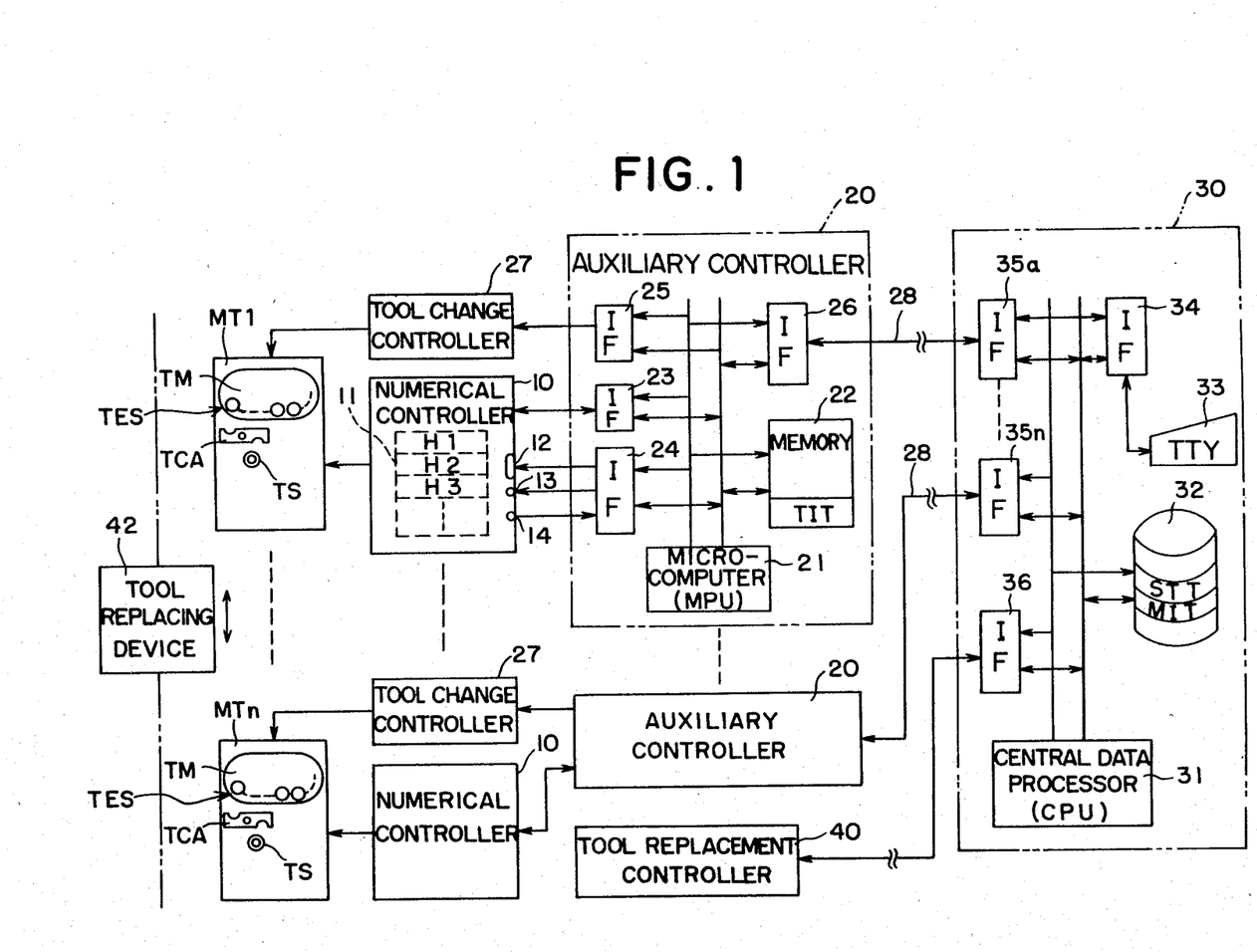
FIG. 1 is a block diagram showing the general construction of a numerical control system according to the present invention.

Referring not to the drawings and particularly to FIG. 1 thereof, reference numerals 10 denote a plurality of numerical controllers for respectively controlling machine tools MT1–MTn associated therewith. Each of these numerical controllers 10 has, in addition to a conventional numerical control function, a tool dimension compensation function for reading out a desired compensation value from a compensation data memory 11 so as to offset the end point of infeed movement designated by each program block of an NC program. Each numerical controller 10 is provided with a revision value input terminal 12, a store signal input terminal 13 and a revision completion signal output terminal 14 for enabling compensation values being stored in the compensation data memory 11 to be revised from the outside. When receiving a store signal at the terminal 13, the numerical controller 10 reads a revision value and a minus or plus sign supplied to the input terminal 12, then adds the read revision value to, or subtracts it from, a compensation value designated by an H or D-code and stores the resultant compensation value in the compensation data memory 11. It is to be noted that the revision of compensation values being stored in the compensation data memory 11 must be carried out with each comensation value to be revised being designated by the H or D-code given in the NC program.

Indicated at 20 are auxiliary controllers, which are respectively located at the sites of the machine tools MT1–MTn being connected to the associated numerical controllers 10. Each of these auxiliary controllers 20 primarily serves for identifying spare tools and for supplying the associated numerical controller 10 with revision values respectively corresponding to the spare tools. Each auxiliary controller 20 is composed of a microcomputer 21, a memory 22 and interfaces 23-26. The interface 23 is coupled to a control terminal (not numbered) of the associated numerical controller 10 from which T and M-codes are output, and the interface 24 is coupled to the above-noted terminals 12-14. The interface 25 is coupled to a tool change controller 27 for enabling the same to perform the rotational indexing of a tool magazine TM and the tool change operation of a tool change arm TCA in response to an instruction from the microcomputer 21. On the other hand, the interface 26 is coupled via a serial transmission line 28 to a corresponding one of interfaces 35a–35n provided in a host computer 30 referred to later.

Figure 2:
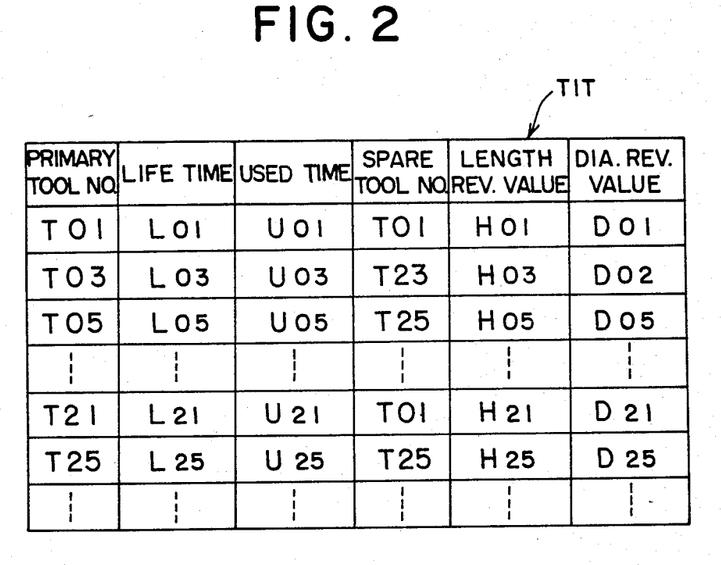
FIG. 2 is an explanatory view of a tool information table formed in a memory of each auxiliary controller shown in FIG. 1.

As shown in FIG. 2, the memory 22 is formed therein with a tool information table TIT, in which tool information on a life time (L), a used time (U), a spare tool number, a tool length revision value (H) and a tool diameter revision value (D) is stored for each of the tools being stored in the tool magazine TM of the associated machine tool MT1. The microcomputer 21 executes processings such as the judgement of the life expiration of each tool, the identification of each spare tool for the life-expired tool and the transmission of revision values to the associated numerical controller 10 based upon the tool information being stored in the tool information table TIT.

Turning back to FIG. 1, the host computer 30, remote from the machine tool sites, is provided for systemically controlling the auxiliary controllers 20. At the time of a tool replacement, for example, the host computer 30 revises or modifies the information of the tool information table TIT by transferring the information on a secondary spare tool which is newly set up in the tool magazine TM of one of the machine tools MT1–MTn to the associated auxiliary controller 20. The host computer 30 is composed of a central data processor 31, a memory unit 32, a data input device 33 such as a teletypewriter and interfaces 35a–35n, 34 and 36. The interfaces 35a–35n are coupled by means of the serial transmission lines 28 to the auxiliary controllers 20 respectively, and the interface 36 is coupled to a tool replacement controller 40 which controls a tool replacing device 42. This replacing device 42 is known and may be a wire-guided, self-propelled robot cart carrying a tool storage unit and a tool replacing robot.

Figure 3A:
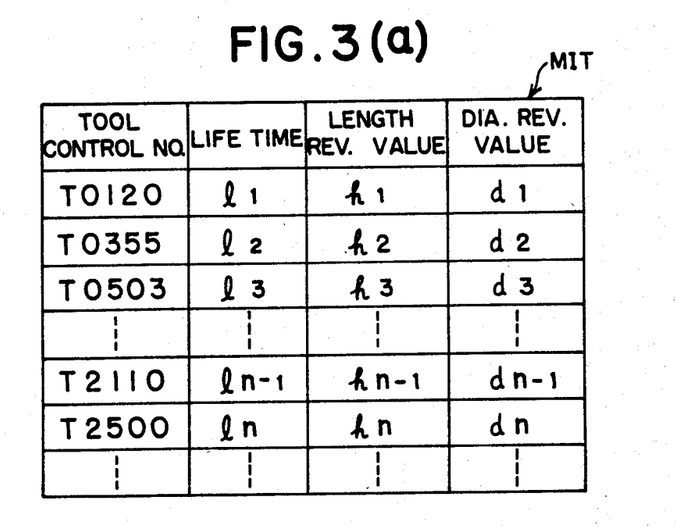
FIGS. 3(a) and 3(b) are respectively explanatory views of a spare tool table and a main storage table formed in a memory unit of a host computer shown in FIG. 1.
Figure 3B:
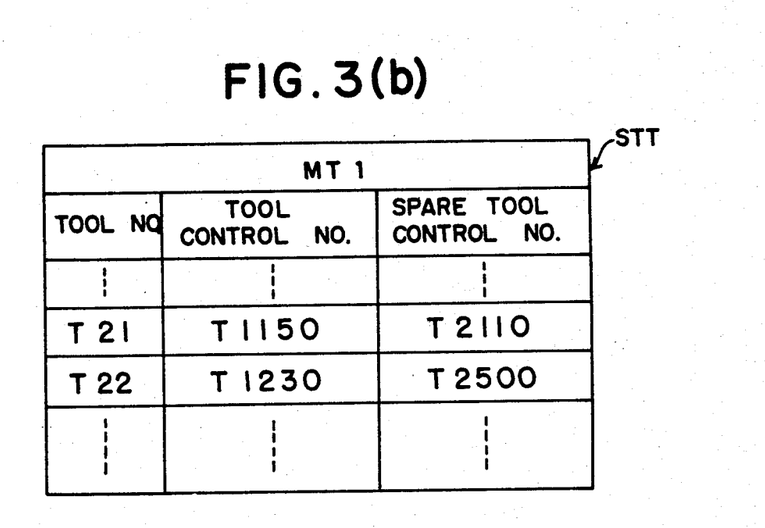

The memory unit 32 stores therein a system control program and in addition, is formed therein with a main storage table MIT and a plurality of spare tool tables STT, which correspond respectively to the machine tools MT1–MTn. As shown in FIG. 3(a), the main storage table MIT stores therein a life time (l), a tool length revision value (h) and a tool diameter revision value (d) for each of secondary spare tools which have been stored in a tool warehouse (not shown) for later setting-up in any one of the tool magazines TM of the machine tools MT1–MTn. As typically shown in FIG. 3(b), each of the spare tool tables STT stores tool numbers, treated at the machine tool sites, and controls numbers of the tools (i.e., primary and spare tools) being stored in the tool magazine TM of the associated machine tool MT1 and also stores control numbers of spare tools (i.e., secondary spare tools) which are prepared to be used in place of the stored tools respectively. In advance of the system operation, necessary data are initially set in the main storage table MIT and each of the spare tool tables STT. Each stored data is revised based upon a command from the data input/output device 33 as need be.

The operation of the system as constructed above and particularly, the operations of the microcomputer 21 and the central data processor 31 will be described hereinafter.

(1) Tool Exchange and Dimension Compensation Operations

Figure 4:
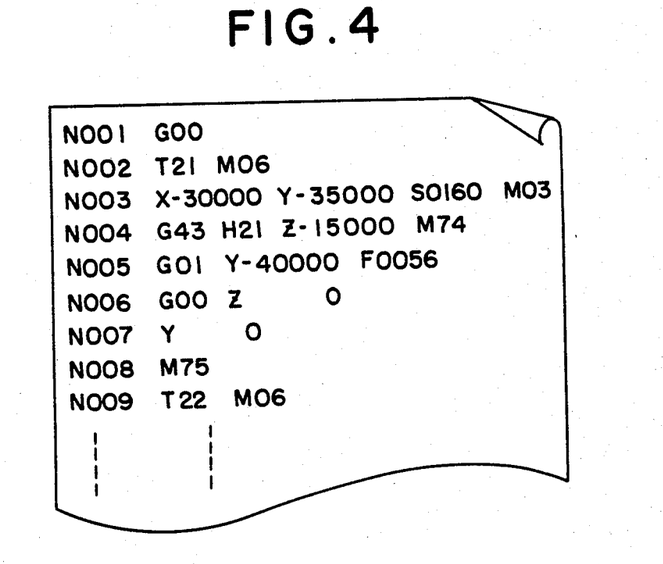
FIG. 4 is an explanatory view showing one example of an NC program.

FIG. 4 exemplifies an NC program utilizing a tool length compensation operation. The NC program is so prepared that a tool T21 is received in a tool spindle TS of the machine tool TM1 in accordance with a tool exchange command M06 of the N002 program block, that rapid positioning movements are effected in accordance with commands of the N003 program block, and that machining feed movements are performed when the N004 and N005 program blocks are executed. Codes G43, H21 and M74 for instructing a tool length compensation on the tool T21 is programmed in the first machining feed program block N004, whereas a code M75 for cancelling the tool length compensation is programed in the N008 program block successive to the completion of a machining by the tool T21. The code G43 represents that the direction in which the tool length compensation is to be done is a positive or plus direction.

Assuming now that the numerical controller 10 for the machine tool MT1 begins to execute the NC program and decodes the commands of the N002 program block, the T-code T21 is output to the auxiliary controller 20 associated with the machine tool MT1. The microcomputer 21 of the associated auxiliary controller 20 recognizes the receipt of the T-code T21 by executing a main routine not shown and executes a tool exchange processing routine shown in FIG. 5. Thus, it is first ascertained in step 50 whether the life of the primary tool T21 designated by the T-code T21 has expired or not, in comparison of the used time (U) with the life time (L) which are stored in the tool information TIT. If it has not expired yet, the microcomputer 21 outputs the T-code T21 to the tool change controller 27 of the machine tool MT1 in step 51 and then, sends a code TFIN representing the completion of this processing to the associated numerical controller 10 in step 52, whereby the designated primary tool T21 is presented to a tool exchange station indicated at TES in FIG. 1.

Figures 5, 7:
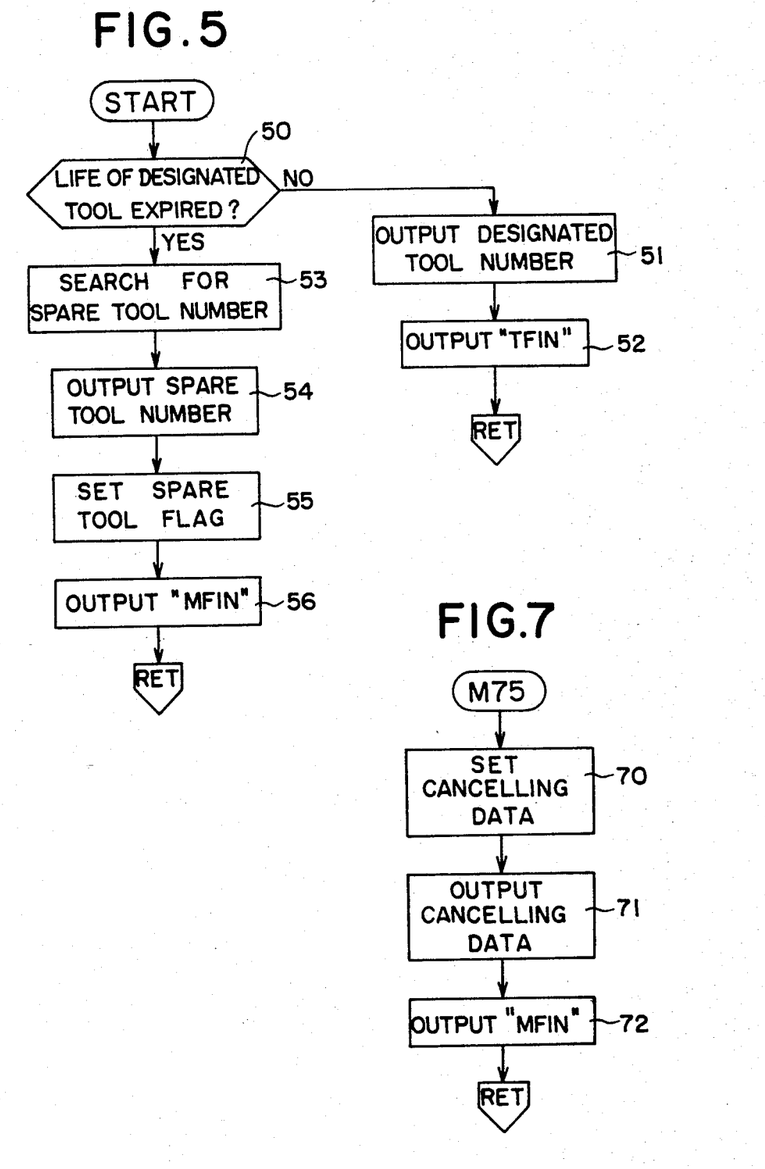
FIG. 5 is a flow chart of a tool exchange processing routine executed by the auxiliary controller for attaching a tool to a tool spindle of a machine tool shown in FIG. 1.
FIG. 7 is a flow chart of a revision cancel routine executed by the auxiliary controller for restoring the revised compensation value to its initial value.

If the life of the designated primary tool T21 has already expired, to the contrary, the microcomputer 21 executes step 53, wherein a tool T01 is ascertained to be a spare tool for the life-expired tool T21 by reference to the tool information table TIT. The tool number of this spare tool T01 is supplied to the tool change controller 27 in step 54, whereby the spare tool T01 is presented to the tool exchange station TES. The numerical controller 10 then reads out an M-code M06 from the same program block to output a tool exchange command to the tool change controller 27, so that the primary tool T21 or the spare tool T01 therefor is received in the tool spindle TS. The numerical controller 10 further executes the N003 program block and other blocks successive thereto after confirming the completion of the tool exchange operation.

More specifically, the numerical controller 10 executes the processing for rapid positioning movements and the processing for rotation of the tool spindle TS in accordance with NC data of the N003 program block and then, executes a machining feed control involving a tool length compensation, in accordance with NC data of the N004 program block. Prior to this feed control, the auxiliary controller 20 executes the processing for revising the corresponding tool length compensation value being stored in the compensation data memory 11, in the manner as described hereinunder in detail.

Reading NC data "G43 H21 Z-15000 M74", the numerical controller 10 sends an M-code M74 to the auxiliary controller 20 to request the revision of the compensation value designated by an H-code H21. When the auxiliary controller 20 feeds back a signal MFIN upon completion of such revision, the numerical controller 10 reads out the revised compensation value designated by the H-code H21, and modifies the end point of Z-axis feed movement by adding the revised compensation value to the read-out Z-axis feed command "−15000". Pulse distribution is effected to perform the Z-axis feed movement toward the compensated end point, whereby a machining operation is performed as programmed.

Figure 6:
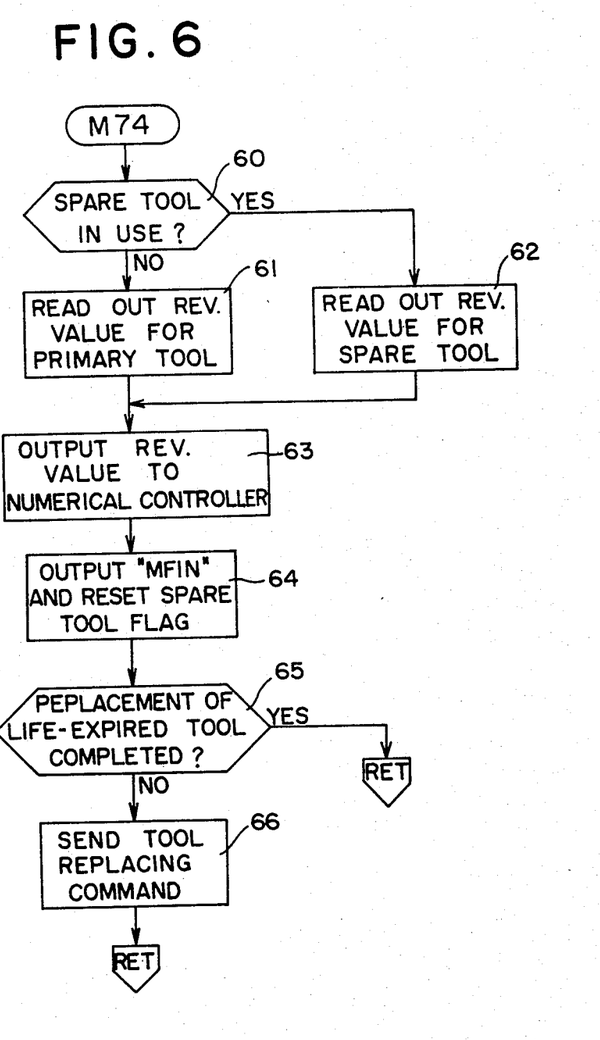
FIG. 6 is a flow chart of a compensation value revising routine executed by the auxiliary controller when a spare tool is attached to the tool spindle in place of the primary tool, for revising a dimension compensation value being stored in each numerical controller shown in FIG. 1.

The application of the M-code M74 to the auxiliary controller 20 causes the microcomputer 21 to execute a compensation value revising routine shown in FIG. 6. Whether the tool currently in use on the tool spindle TS is a primary tool or a spare tool therefor is first checked in step 60 by reference to the state of a spare tool flag not shown which was set in step 55. A revision value for the primary tool T21 or another revision value for the spare tool T01 is read out in step 61 or step 62 depending upon the result of such checking and is output to the numerical controller 10. Consequently, the value of the H-code H21 which is stored in the compensation data memory 11 and which has been selected in accordance with the N004 program block is revised by the revision value supplied from the auxiliary controller 20, in the numerical controller 10.

Figure 8:
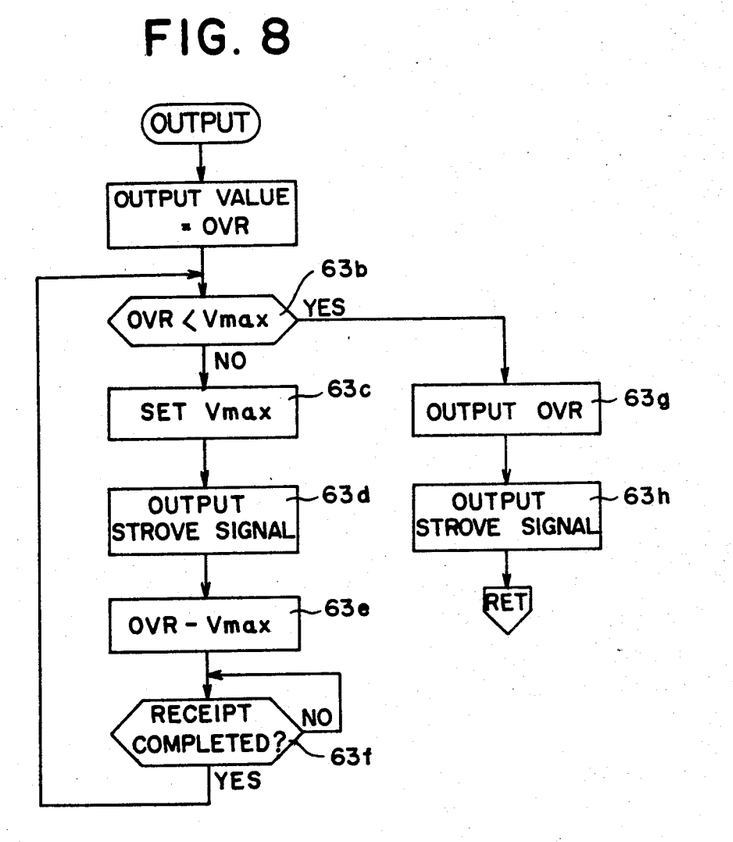
FIG. 8 is a flow chart of a revision value transfer routine executed by the auxiliary controller for transferring the whole of a revision value to the numerical controller.

It is to be noted herein that the compensation of tool length is unnecessary where any primary tool such as the tool T21 is used on the tool spindle TS. To this end, an address of the compensation data memory 11 for the H-code H21 has been beforehand set with a dimension compensation value indicating zero (0), and the revision value H21 being stored in the tool information table TIT in correspondence with the primary tool T21 has been initially chosen to indicate zero. In this connection, the revision value H01 which has been stored in advance in the tool information table TIT for the spare tool T01 indicates the difference in dimension between the primary tool T21 and the spare tool T01. It is also to be noted that because of a limited bit number at the revision value input terminal 12, each compensation value in the numerical controller 10 cannot be revised more than 7.999 millimeters at a time. Therefore, when revising a compensation value more than 7.999 millimeters, the microcomputer 21 under the control of a revision value transfer routine shown in FIG. 8 sends the whole of a revision value to the numerical controller 10 in such a manner that a maximum unit revision value Vmax which may be an integer smaller than 7.999 is sent one or more times in steps 63c before the successive sending of the fraction in step 63g.

The numerical controller 10 modifies the Z-axis feed command "−15000" based upon the compensation value H21 which has been subjected to revision in the foregoing manner and distributes feel pulses in accordance with the modified Z-axis feed command. Accordingly, it is possible to perform a desired machining even when a spare tool is subsequently used instead of the primary tool.

Further, when the M-code M74 is supplied to the auxiliary controller 20, the microcomputer 21 in step 65 ascertains whether the replacement of the life-expired primary tool T21 with the spare tool T01 has been completed or not, by checking the state of a flag not shown which has been reset since the life of the primary tool T21 was ascertatined to have expired in step 50. If the flag has still been reset, in other words, if such replacement has not been completed yet, the microcomputer 21 transfers a tool replacing command along with the tool number of the life-expired tool T21 to the host computer 30 in step 66.

On the other hand, when M-code data M75 in the N008 program block is read out by the numerical controller 10 to be output to the auxiliary controller 20, the same executes a revision cancel routine shown in FIG. 7 for cancelling the revision from the outside. That is, the microcomputer 21 in step 70 sets cancelling data which is the same value as the revision value that it supplied to the numerical controller 10 in response to the M-code M74, but which has the opposite sign and then, supplies the cancelling data to the numerical controller 10 in the same manner as described above. As a result, the compensation value designated by the H-code H21 is returned to the previous or initial value.

(2) Tool Replacing Operation

When the spare tool T01 is put in use as a result of the expiration of the life of the above-noted primary tool T21, the tool replacing command is supplied along with the tool number of the primary tool T21 from the auxiliary controller 20 to the host computer 30, as mentioned earlier in connection with step 66. Thus, the host computer 30 executes a routine shown in FIG. 9 in response thereto.

Figure 9:
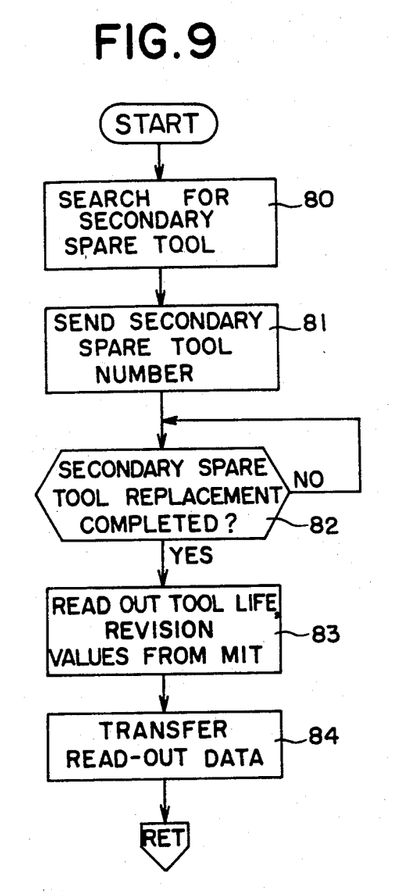
FIG. 9 is a flow chart of another revision value transfer routine executed by the host computer for transferring a revision value for a secondary spare tool to the auxiliary controller.

Step 80 is first executed, wherein based upon the life-expired tool number T21 transferred from the auxiliary controller 20, the spare tool table SIT is searched for a secondary spare tool T2110 which is stored in the tool warehouse (not shown) for replacement of the life-expired primary tool T21. The control number of the searched secondary spare tool T2110 is then sent to the tool replacement controller 40 in step 81. Consequently, the secondary spare tool T2110 is taken out from the tool warehouse, is transferred to the vicinity of the tool magazine TM storing the life-expired primary tool T21 and is replaced with the same to be set up in the tool magazine TM. Such tool taking-out, transfer and replacement operations are done by the tool replacing device 42 which is operated under the control of the tool replacement controller 40.

When completion of such tool replacement is confirmed in step 82, the tool life (ln−1), tool length revision value (hn−1) and tool diameter revision value (dn−1) for the secondary tool T2110 are read out from the main storage table MIT in step 83. These data, along with the tool number of the life-expired primary tool T21, are then transferred as the data relating to the primary tool T21 to the auxiliary controller 20 in a predetermined order in step 84.

Figure 10:
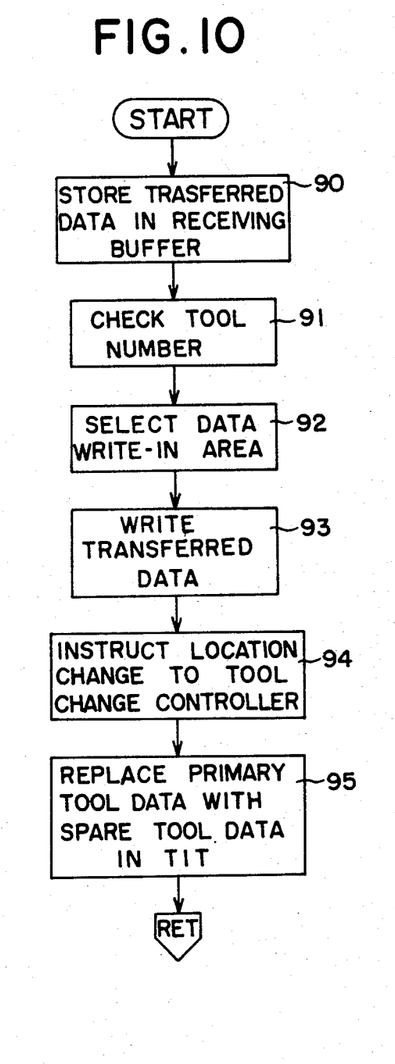
FIG. 10 is a flow chart of a data replacing routine executed by the auxiliary controller for replacing data for a spare tool with data for a secondary spare tool therefor in the data memory.

Responsive to such tool information, the auxiliary controller 20 executes a routine shown in FIG. 10 to store the transferred data in a receiving buffer not shown in step 90. The transferred tool number is then checked in step 91 to identify a tool to which the transferred tool information relates. If the primary tool T21 is ascertained to relate to the transferred tool information, an area of the tool information table TIT which is allocated to the primary tool T21 is selected in step 92, and the various data included in the received information are in turn written respectively in the corresponding locations of the selected area in step 93, whereby the tool life time (L21), the tool length revision value (H21) and the tool diameter revision value (D21) are revised or modified. In this case, because no tool diameter compensation is to be performed with respect to the primary tool T21, the rewriting of the tool diameter compensation value (D21) does not have any meaning. The used time (U21) for the tool T21 is reset by the data rewriting to indicate zero.

Figure 11:
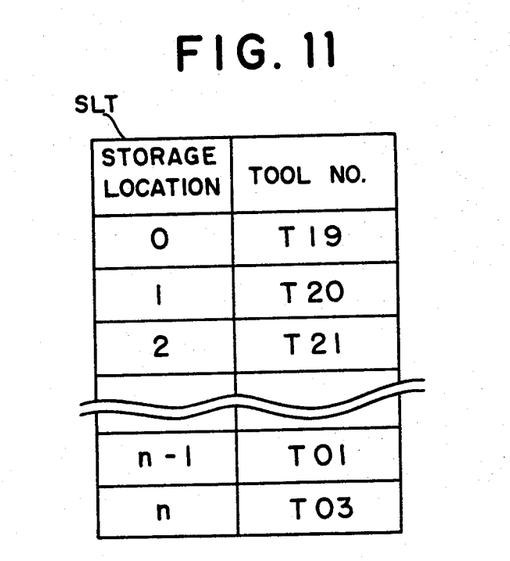
FIG. 11 is an explanatory view of a storage location table provided in a tool change controller shown in FIG. 1 for indicating storage locations of tools in the tool magazine.

In subsequent step 94, the microcomputer 21 instructs the tool change controller 27 to rewrite the information being stored in a storage location table SLT shown in FIG. 11 so that the space tool T01 is regarded as the primary tool T21 and so that the secondary spare tool T2110 which has been set up in the tool magazine TM is regarded as the spare tool T01. Step 95 is next executed, wherein the information on the primary tool 21 is completely replaced with the information on the spare tool T01 in the tool information table TIT. Thus, in the tool exchange operation as well as in the tool dimension compensation processing, the spare tool T01 which has been stored in the tool magazine TM from the beginning is treated as the primary tool T21, and the secondary spare tool T2110 which has been newly stored in the tool magazine TM in place of the primary tool T21 is treated as the spare tool T01. Accordingly, when the spare tool T01 which has become the primary tool T21 subsequently reaches the end of its life, the secondary spare tool T2110 is used on the tool spindle TS instead of the spare tool T01, whereby the machining operation of the machine tool MT1 can be continued.

In the above-described particular embodiment, when a primary tool is replaced with a secondary spare tool therefor, tool information is transmitted along a tool number from the host computer 30 to the auxiliary controller 20 for the purpose of tool information identification. However, the transmission of the tool number is not essential to such tool information identification. For example, it is possible to identify the tool on which the tool information is transmitted from the host computer 30, by holding in the auxiliary controller 20 the tool number of the tool for which tool replacement is requested to the host computer 30. Further, in the above-described particular embodiment, the rewriting of dimension revision values is done when a secondary spare tool is set up in a tool magazine in place of a primary tool. However, the present invention is also applicable to the case where the rewriting of dimension revision values is done in conjunction with the replacement of primary tools which accompanies the change in the kind of workpieces to be machined.

Furthermore, it is to be noted that the present invention may be practiced in a machine tool numerical control system wherein no spare tools are parepared in advance in a tool magazine of each machine tool, but wherein any of primary tools, when reaching the end of its life, is replaced with a spare tool therefor which is taken out and transferred from a tool warehouse.

Figure 12:
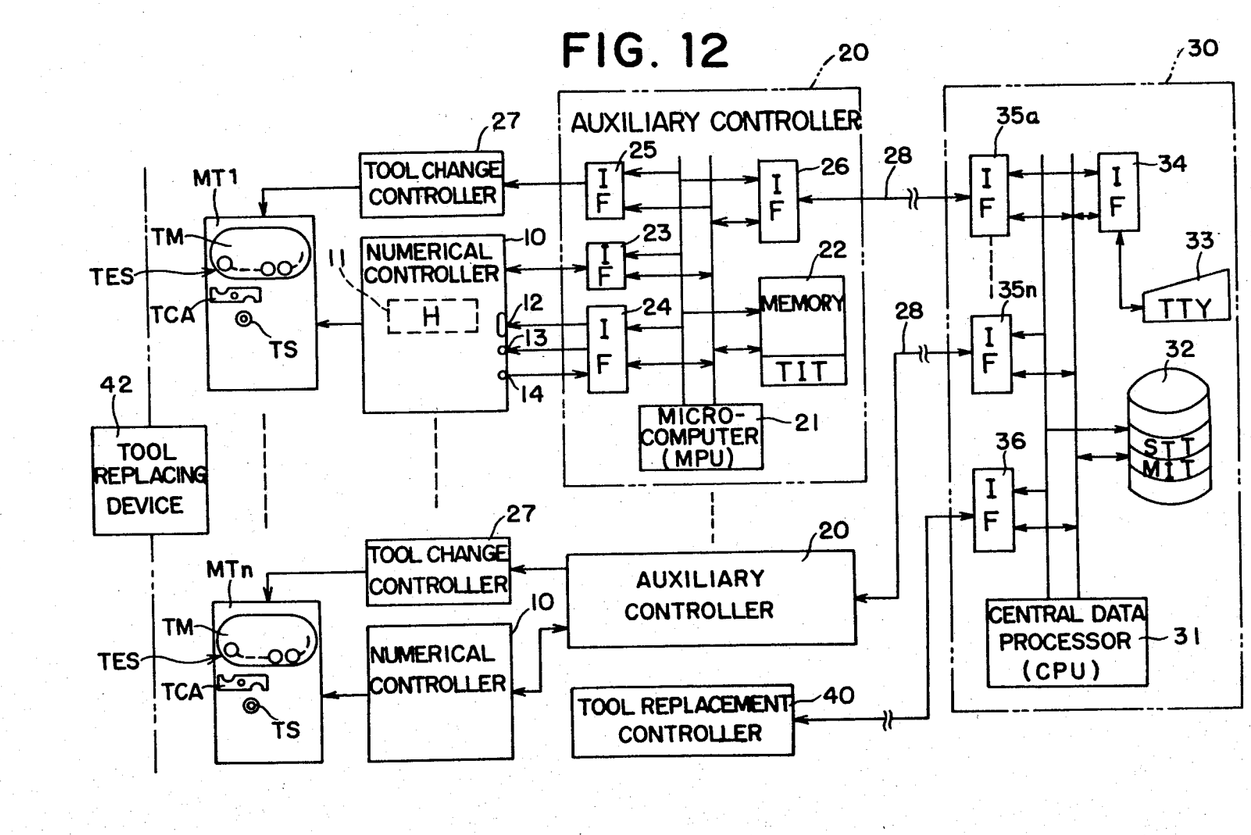
FIG. 12 is a block diagram showing the general construction of a numerical control system according to a second embodiment of the present invention.

Referring now to FIG. 12, there is shown another embodiment of the present invention, wherein the compensation data memory 11 provided in each of the numerical controllers 10 is modified to store one tool dimension compensation value at a time. Each of the tool information table TIT formed in the memory 22 and the main storage table MIT formed in the memory unit 32 are also modified to store, at an storage area for each tool, length and diameter compensation values instead of length and diameter revision values. Further, the NC program is modified to delete therefrom any H-code such as H-21 seen at the N004 program block.

Thus, when the M-code M74 included in the N004 program block of the NC program is supplied from the numerical controller 10 to the auxiliary controller 20 as mentioned earlier, not a revision value but a compensation value is read out in step 61 or step 62 and is transferred from the auxiliary controller 20 to the numerical controller 10 in step 63. In this case, the transferred compensation value is stored as it is, in the compensation data memory 11 of the numerical controller 10. Further, when executing the routine shown in FIG. 9 in response to the tool replacing command which is generated in step 66 as mentioned previously, the data processor reads out tool information including dimension compensation values, from the main storage table MIT in step 83 and transfers the tool information to the auxiliary controller 20 in step 84. Accordingly, the tool information including the dimension compensation values is processed by the microcomputer 21 in steps 93 and 95.

It is to be noted that the revision cancel routine shown in FIG. 7 is not executed in the above described second embodiment.

Obviously, numerous modifications and variations are possible in light of the above-teachings. It is therefore to be understood that within the scope of the appended claims, the present invention may be practiced otherwise than as specifically described herein.

What is claimed is:

1. A numerical control system for a machine tool with a tool magazine for removably storing a plurality of tools which are to be selectively attached to a tool spindle, said system comprising:
   a numerical controller coupled to said machine tool in the vicinity thereof for controlling said machine tool in accordance with a numerical control program said numerical controller including a first memory means for storing at least one dimension compensation value, said numerical controller being capable of modifying, based upon said at least one dimension compensation value, a feed movement of said machine tool which is performed in accordance with a program block of said numerical control program;
   an auxiliary controller coupled to said numerical controller at the site of said machine tool and including;
      (a) second memory means for storing a plurality of compensation data each of said plurality of compensation data being respectively associated with said tools being stored in said tool magazine;
      (b) data selector means for selecting a corresponding one of said compensation data stored in said second memory means when one of said tools stored in said tool magazine is attached to said tool spindle so as to supply said selected one compensation data to said numerical controller, said numerical controller being responsive to said selected one compensation data for storing said compensation value in said first memory means; and
      (c) data rewriting means for rewriting one of said compensation data being stored in said second memory means based upon compensation data supplied to said auxiliary controller; and
   a host computer remote from the site of said machine tool and communicating with said auxiliary controller, said host computer including:
      (a) third memory means for storing a plurality of compensation data respectively associated with spare tools each of which is scheduled to be stored in said tool magazine; and
      (b) data transfer means operable when one of said spare tools is replaced with one of said tools being stored in said tool magazine, for reading out from said third memory means one of said compensation data which corresponds to said one of spare tools and for transferring said read-out one compensation data to said auxiliary controller so as to enable said data rewriting means to rewrite said read-out one compensation data corresponding to said one of said tools taken out from said tool magazine.

2. A numerical control system as set forth in claim 1, wherein:
   said tools being stored in said tool magazine includes primary tools and spare tools therefore;
   said spare tools which are scheduled to be stored in said tool magazine are prepared for use as secondary spare tools;
   said second memory means further includes a plurality of storage areas respectively allocated to said primary and spare tools being stored in said tool magazine; and wherein when one of said primary tools is replaced with one of said secondary spare tools, said data rewriting means rewrites said compensation data being stored in one of said storage areas allocated to said replaced primary tool by said compensation data transferred from said host computer to said auxiliary computer and subsequently replaces with each other said compensation data being respectively stored in said storage areas which are respectively allocated to said replaced primary tool and said spare tool therefore.

3. A numerical control system as set forth in claim 2, wherein:
   said host computer further includes fourth memory means for storing a tool number reference table in which tool numbers of said primary, spare and secondary spare tools identifiable by said numerical controller and said auxiliary controller are registered along with corresponding tool control numbers therefor which are identifiable by said host computer;
   said third memory means stores said tool control numbers along with said compensation data respectively corresponding thereto; and
   said data transfer means includes:
   search means responsive to the tool number of said replaced primary tool which is taken out from said tool magazine, for searching said tool number reference table for the tool control number of said secondary spare tool which is stored in said tool magazine in place of said replaced primary tool; and
   read-out means for reading out from said third memory means one of said compensation data which corresponds to said searched tool control number so as to transfer said read-out compensation data to said auxiliary controller.

4. A numerical control system as set forth in claim 3, whrein said auxiliary controller further includes:
data division means for dividing said compensation data read out from said third memory means into one or more maximum unit compensation data and the fraction; and
transfer control means for controlling said data transfer means to transfer said one or more maximum unit compensation data and the fraction in order.

5. A numerical control system as set forth in claim 4, wherein:
each of said compensation data being stored in said second memory means represents an actual compensation value for a corresponding one of said tools being stored in said tool magazine; and
said at least one compensation value stored in said first memory means represents said actual compensation value transferred from said auxiliary controller.

6. A numerical control system as set forth in claim 4, wherein:
said first memory means stores a plurality of compensation values for said primary tools being stored in said tool magazine;
said second memory means stores as said compensation data a plurality of revision values each of which represents the difference between the compensation values of one of said primary tools and a corresponding one of said spare tools being stored in said tool magazine; and
said data selection means is operable when one of said spare tools is attached to said tool spindle in place of a corresponding one of said primary tools, for selecting a corresponding one of said revision values being stored in said second memory means so as to supply said selected revision value to said numerical controller.

7. A numerical control system for a machine tool with a tool magazine for removably storing a plurality of primary tools which are to be selectively attached to a tool spindle, said system comprising:
a numerical controller coupled to said machine tool for controlling said machine tool in accordance with a numerical control program, said numerical controller including first memory means for storing at least one tool dimension data, said numerical controller being capable of modifying, based upon said at least one tool dimension data, a feed movement of said machine tool which is performed in accordance with a program block of said numerical control program; and
system control means coupled to said numerical controller and including:
(a) second memory means for storing first and second tool dimension data being respectively associated with first and second spare tools, said first spare tool being scheduled to be used in place of one of said primary tools being stored in said tool magazine, said second spare tool being scheduled to be used in place of said first spare tool;
(b) data read-out means for reading out a corresponding one of said first and second tool dimension data from said second memory means so as to enable said corresponding one of said first and second tool dimension data to be supplied to said numerical controller when any of said first and second spare tools is used on said tool spindle; and
(c) data transfer means for transferring said first tool dimension data read out from said data read-out means to said numerical controller when said first spare tool is used on said tool spindle in place of said one of said primary tools and for transferring said second tool dimension data read-out from said data read-out means to said numerical controller when said second spare tool is used on said tool spindle in place of said first spare tool.

8. A numerical control system as set forth in claim 7, wherein:
said at least one tool dimension data stored in said first memory means represents a dimension compensation value by which said feed movement of said machine tool is to be modified;
said first and second tool dimension data stored in said second memory means respectively represent the dimensional difference between said one of said primary tools and said first spare tool and the dimensional difference between said first and second spare tools; and
said numerical controller being capable of revising said dimension compensation value by any of said dimensional differences supplied thereto.

9. A numerical control system as set forth in claim 7, wherein said first spare tool is stored in said tool magazine together with said plurality of said primary tools and wherein said system control means further includes means for generating a command instructing the replacement of said one of said primary tools with said second spare tool when said one of said primary tools reaches the end of its life;
said numerical control system further comprising:
tool replacing means; and
a tool replacing controller responsive to said command from said system control means for controlling said tool replacing means to remove said one of said primary tools from said tool magazine and to store said second spare tool in said tool magazine.

* * * * *